US010436654B2

(12) United States Patent
Su et al.

(10) Patent No.: US 10,436,654 B2
(45) Date of Patent: Oct. 8, 2019

(54) INTERACTION FORCE DETECTION APPARATUS

(71) Applicant: Industrial Technology Research Institute, Hsinchu (TW)

(72) Inventors: Chung-Yuan Su, Tainan (TW); Chih-Yuan Chen, Taipei (TW); Chao-Ta Huang, Hsinchu (TW); Yu-Wen Hsu, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 15/430,555

(22) Filed: Feb. 13, 2017

(65) Prior Publication Data
US 2018/0188123 A1    Jul. 5, 2018

(30) Foreign Application Priority Data
Dec. 29, 2016    (TW) .............................. 105143747 A

(51) Int. Cl.
*G01L 1/22* (2006.01)
*G01L 5/00* (2006.01)
(Continued)

(52) U.S. Cl.
CPC .......... *G01L 1/2206* (2013.01); *G01L 5/0052* (2013.01); *G01L 5/162* (2013.01);
(Continued)

(58) Field of Classification Search
CPC ......... G01L 5/161; G01L 5/20; G01L 3/1457; G01L 3/108; G01L 1/22; G01L 1/2231; G01L 1/2206
(Continued)

(56) References Cited

U.S. PATENT DOCUMENTS 4,094,192 A * 6/1978 Watson ................... G01L 5/161
                                                                  338/2
4,196,337 A * 4/1980 Jewett ................... G01L 3/1457
                                                                  219/121.35
(Continued)

FOREIGN PATENT DOCUMENTS

CN    201522347    7/2010
CN    202940699    5/2013
(Continued)

OTHER PUBLICATIONS

Yu-Xiang Sun et al., "Design and Calibration of a Torque Sensor Based on Sectional Redundant Measurements", Proceeding of the 2015 IEEE International Conference on Information and Automation Lijiang, China, Aug. 2015, 262~267.
(Continued)

*Primary Examiner* — Jonathan M Dunlap
(74) *Attorney, Agent, or Firm* — JCIPRNET

(57) ABSTRACT

An interaction force detection apparatus includes a sensor, a driving element, a moving element, and a connecting element. The connecting element is connected to the driving element and the sensor. The driving element is adapted to interact with the moving element, so as to generate a pair of forces. The pair of forces includes a first force and a second force, and a magnitude of the first force is equal to that of the second force. The sensor detects the first force exerted on the driving element, and the second force is exerted on the moving element to generate a movement.

20 Claims, 2 Drawing Sheets

(51) Int. Cl.
*G01L 5/16* (2006.01)
*G01L 3/14* (2006.01)
*G01L 3/10* (2006.01)

(52) U.S. Cl.
CPC .............. *G01L 1/22* (2013.01); *G01L 1/2231* (2013.01); *G01L 3/108* (2013.01); *G01L 3/1457* (2013.01)

(58) Field of Classification Search
USPC ...... 73/862.041–862.046, 862.338, 862.321, 73/862.08, 862.621, 862.632, 862.637, 73/847
See application file for complete search history.

(56) References Cited

U.S. PATENT DOCUMENTS

| | | | |
|---|---|---|---|
| 4,432,245 A | 2/1984 | Hattori et al. | |
| 4,573,362 A * | 3/1986 | Amlani | G01L 1/2218 73/862.044 |
| 4,907,168 A * | 3/1990 | Boggs | G01L 3/1457 702/41 |
| 4,911,024 A * | 3/1990 | McMaster | G01L 5/161 73/862.044 |
| 5,063,788 A * | 11/1991 | Ch'Hayder | G01L 5/161 73/862.043 |
| RE34,039 E | 8/1992 | Kobayashi et al. | |
| 5,197,338 A | 3/1993 | Heiman et al. | |
| 5,327,790 A * | 7/1994 | Levin | B25J 9/12 73/862.321 |
| 5,889,214 A * | 3/1999 | Kang | G01L 5/161 73/862.043 |
| 5,894,094 A * | 4/1999 | Kuchler | G01L 1/2262 73/146 |
| 5,925,832 A * | 7/1999 | Bruns | G01L 1/042 73/862.632 |
| 5,969,268 A * | 10/1999 | Sommerfeld | G01L 1/2206 73/862.041 |
| 6,038,933 A * | 3/2000 | Meyer | G01L 1/2206 73/146 |
| 6,269,702 B1 * | 8/2001 | Lambson | G01L 3/108 73/862.045 |
| 6,439,063 B1 * | 8/2002 | Schnackenberg | G01L 5/161 73/862.041 |
| 6,513,395 B1 | 2/2003 | Jones | |
| 6,769,312 B2 * | 8/2004 | Meyer | G01L 5/161 73/862.042 |
| 6,792,815 B2 * | 9/2004 | McDearmon | G01L 5/161 73/862.041 |
| 6,952,972 B2 * | 10/2005 | Schulze | G01G 23/005 73/862.041 |
| 6,978,686 B2 | 12/2005 | Shimizu et al. | |
| 7,134,329 B2 | 11/2006 | Ha | |
| 7,520,182 B2 * | 4/2009 | Takamura | G01L 3/1457 73/862.08 |
| 7,743,672 B2 * | 6/2010 | Kurtz | G01L 3/1457 73/862.041 |
| 8,161,828 B1 * | 4/2012 | Clegg | G01L 3/1457 73/862.08 |
| 8,250,935 B2 * | 8/2012 | Meuter | G01L 3/1457 73/862.045 |
| 8,291,775 B2 * | 10/2012 | Nagasaka | B25J 13/085 73/862.041 |
| 8,433,485 B2 * | 4/2013 | Marin | G01L 3/102 701/51 |
| 8,646,560 B2 | 2/2014 | Chan | |
| 8,667,854 B2 * | 3/2014 | Nishioki | G01L 3/10 73/780 |
| 8,904,883 B2 * | 12/2014 | Clegg | G01L 3/1457 73/862.08 |
| 9,146,167 B2 | 9/2015 | Kapas et al. | |
| 9,289,265 B2 * | 3/2016 | Monfaredi | A61B 34/30 |
| 9,448,128 B2 * | 9/2016 | Kim | G01L 5/161 |
| 2002/0059837 A1 * | 5/2002 | Meyer | G01L 1/2231 73/862.042 |
| 2003/0209085 A1 * | 11/2003 | McDearmon | G01L 5/161 73/862.041 |
| 2005/0050957 A1 * | 3/2005 | Schulze | G01G 23/005 73/760 |
| 2009/0113999 A1 * | 5/2009 | Gerstler | C22C 19/055 73/86 |
| 2009/0301217 A1 * | 12/2009 | Kurtz | G01L 3/1457 73/847 |
| 2010/0162799 A1 | 7/2010 | Andersson et al. | |
| 2011/0041625 A1 * | 2/2011 | Meuter | G01L 3/1457 73/862.338 |
| 2011/0239788 A1 * | 10/2011 | Nagasaka | G01L 3/1457 73/862.338 |
| 2012/0180574 A1 * | 7/2012 | Clegg | G01L 3/1457 73/862.621 |
| 2012/0186364 A1 * | 7/2012 | Marin | G01L 3/102 73/862.325 |
| 2013/0167661 A1 * | 7/2013 | Nishioki | G01L 3/106 73/862.337 |
| 2013/0239701 A1 * | 9/2013 | Huang | G01L 1/22 73/862.045 |
| 2014/0252923 A1 | 9/2014 | Wang | |
| 2015/0018840 A1 * | 1/2015 | Monfaredi | A61B 34/30 606/130 |
| 2015/0135856 A1 * | 5/2015 | Kim | G01L 5/161 73/862.045 |

FOREIGN PATENT DOCUMENTS

| | | |
|---|---|---|
| TW | I379793 | 12/2012 |
| WO | 2013072254 | 5/2013 |

OTHER PUBLICATIONS

Dieter Vischer et al., "Design and Development of High-Performance Torque-Controlled Joints", IEEE Transactions on Robotics and Automation, vol. 11, No. 4, Aug. 1995, 537~544.

Seunghwan Kim et al., "Development of an integrated torque sensormotor module for haptic feedback in teleoperated robot-assisted surgery", 2009 IEEE International Conference on Technologies for Practical Robot Applications, Nov. 2009, 10~15.

"Office Action of Taiwan Counterpart Application," dated Dec. 5, 2017, p. 1-p. 4, in which the listed references were cited.

* cited by examiner

INTERACTION FORCE DETECTION APPARATUS

CROSS-REFERENCE TO RELATED APPLICATION

This application claims the priority benefit of Taiwan application serial no. 105143747, filed on Dec. 29, 2016. The entirety of the above-mentioned patent application is hereby incorporated by reference herein and made a part of this specification.

BACKGROUND

Technical Field

The disclosure relates to an interaction force detection apparatus.

Related Art

According to the present motor torque detection technologies, for example, a sensor apparatus, e.g., a torque sensor, is disposed on a rotary axis of a motor for measuring an output torque by the motor directly. However, the torque sensor has an input/output signal line; during the rotation of the rotary axis, the rotary axis may be entangled with the signal line, and the signal line may be pulled apart consequently. The torque sensor may merely be applied to measure a static torque of the motor as a result, and applications of the torque sensor are thus limited.

At present, a carbon brush may be used by the torque sensor to transmit signals. However, an abrasion may occur when the carbon brush is being used, thus resulting in an increase in the repair and maintenance difficulties. Besides, although the torque sensor may be disposed between an output terminal and a load terminal of the motor through a planetary gear set, lubrication oil used to lubricate a rotation member such as the gear set or a rotation axis may pollute the torque sensor. Moreover, when the rotation member of the motor operates, the ambient temperature may be increased, which also affects characteristics of the torque sensor as well as the sensing accuracy and the reliability of the torque sensor as a result.

SUMMARY

An interaction force detection apparatus is introduced herein by the disclosure, wherein a sensor of the interaction force detection apparatus is connected to a connecting element, and the sensor may detect a magnitude of a reaction force exerted on a driving element through the connecting element.

An interaction force detection apparatus is introduced herein by the disclosure, and the interaction force detection apparatus is equipped with an integrated circuit (IC) chip disposed in an accommodating space of the sensor, so as to calculate the magnitude of the reaction force exerted on the driving element.

An interaction force detection apparatus is introduced herein by the disclosure. The interaction force detection apparatus has a base, and the driving element and the connecting element may be fixed to the base through the sensor.

In an embodiment of the disclosure, an interaction force detection apparatus includes a sensor, a driving element, a moving element, and a connecting element. The connecting element is connected to the driving element and the sensor. The driving element is adapted to interact with the moving element to generate a pair of forces. The pair of forces includes a first force and a second force, and a magnitude of the first force is equal to that of the second force. The first force exerted on the driving element is detected by the sensor, and the second force is exerted on the moving element to generate a movement.

In an embodiment of the disclosure, an interaction force detection apparatus includes a sensor, a driving element, a moving element, a connecting element, and an IC chip. The sensor includes a strain gauge and an elastic element, and at least one strain gauge is disposed on the elastic element. The connecting element is connected to the driving element and the sensor. The IC chip is disposed in an accommodating space of the sensor. The driving element is adapted to interact with the moving element to generate a pair of forces. The pair of forces includes a first force and a second force, and a magnitude of the first force is equal to that of the second force. The first force exerted on the driving element is detected by the sensor, such that an electrical signal is transmitted to the IC chip by a strain gauge. The second force is exerted on the moving element to generate a movement.

In an embodiment of the disclosure, the interaction force detection apparatus provided by the disclosure includes a sensor, a driving element, a moving element, a connecting element, an IC chip, and a base. The sensor includes at least one strain gauge. The connecting element is connected to the driving element and the sensor. The IC chip is disposed in an accommodating space of the sensor. The sensor is connected to the base and the connecting element. The driving element is adapted to interact with the moving element to generate a pair of forces. The pair of forces includes a first force and a second force, and a magnitude of the first force is equal to that of the second force. The sensor detects the first force exerted on the driving element and the at least one strain gauge transmits an electrical signal to the integrated circuit chip accordingly, and the second force is exerted on the moving element to generate a movement.

In view of the foregoing, as provided in the embodiments of the disclosure, the sensor of the interaction force detection apparatus is disposed outside the driving element, the moving element, and the connecting element, and the sensor is not connected to the moving element. In addition, the action force may be applied on the moving element by the driving element, and the reaction force generated from the moving element in response to the action force is exerted on the driving element at the same time. Furthermore, the reaction force exerted on the driving element may be transmitted to the sensor through the connecting element. The reaction force exerted on the driving element is detected by the sensor, and the magnitude of the reaction force is calculated by the sensor.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSURED EMBODIMENTS

Figure 1:
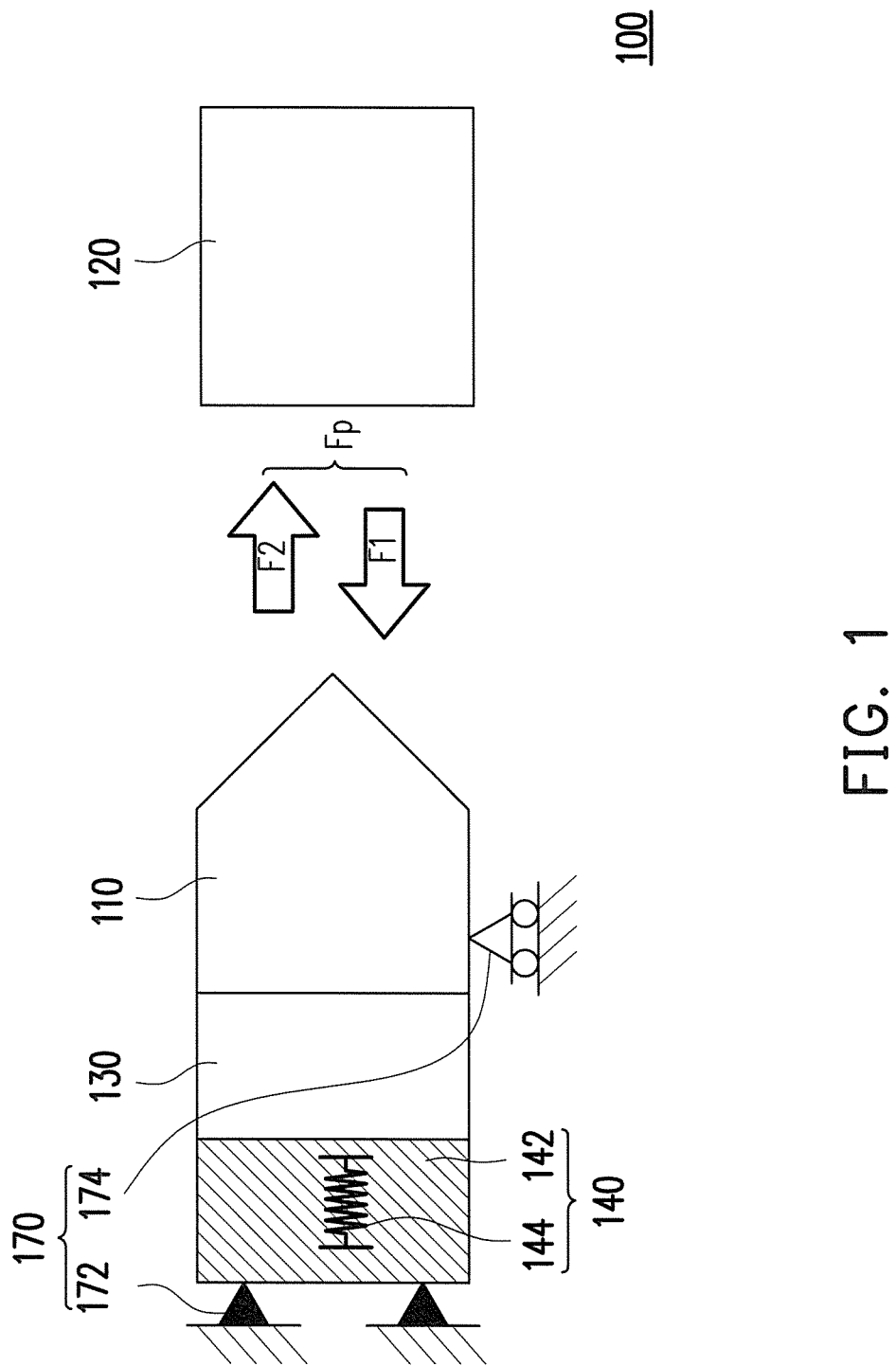
FIG. 1 is a schematic diagram illustrating an interaction force detection apparatus according to an exemplary embodiment.

FIG. 1 is a schematic diagram illustrating an interaction force detection apparatus according to an exemplary embodiment. The embodiment provides that an interaction force detection apparatus 100 includes a driving element 110, a moving element 120, a connecting element 130, and a sensor 140. As shown in FIG. 1, the moving element 120 is located at a side of the driving element 110. The driving element 110 is fixed on the connecting element 130. Furthermore, the sensor 140 is connected to the other side of the connecting element 130. In other words, as shown in FIG. 1, the connecting element 130 is connected to the sensor 140 and the driving element 110, respectively.

In the embodiment, the driving element 110 is adapted to interact with the moving element of 120 through an interaction force, and a pair of forces $F_P$ is generated and applied to the driving element 110 and the moving element 120, respectively. The pair of forces $F_P$ includes two forces that have equal magnitude but face opposite directions. The pair of forces FP may be contact-type interaction forces, for example, an action force and a reaction force generated when two bodies collide or an action force and a reaction force generated when one body impacts the other body. The pair of forces $F_P$ may also be non-contact-type action-at-a-distance forces, for example, electrostatic forces between two bodies with electric charges or magnetic forces between two magnetic bodies.

As provided in the embodiment, the pair of forces FP includes a first force F1 and a second force F2. A magnitude of the first force F1 is equal to that of the second force F2. As shown in FIG. 1, the first force F1 is applied to the driving element 110, and the second force F2 is applied to the moving element 120. A movement of the moving element 120 (e.g., a displacement or a rotation) is generated when the second force F2 is exerted on the moving element 120. The first force F1 is transmitted to the sensor 140 by the driving element 110 through the connecting element 130.

In the embodiment, the sensor 140 includes elastic element 142 and a strain gauge 144 disposed on the elastic element 142. According to the above, a corresponding strain is generated by the elastic element 142 according to a magnitude of the first force F1 transmitted by the connecting element 130 to the sensor 140. A magnitude of the strain of the elastic element 142 is measured by the strain gauge 144, and the magnitude of the first force F1 exerted on the driving element 110 is calculated according to the magnitude of the strain of the elastic element 142. The embodiment provides that a magnitude of the second force F2 corresponding to the first force F1 is further calculated by the interaction force detection apparatus 100 through the calculated and obtained first force F1.

In the embodiment, a stiffness of the elastic element 142 of the sensor 140 is less than a stiffness of the connecting element 130 and less than a stiffness of the driving element 110, such that the sensor 140 is equipped with a higher detection sensitivity. However, a certain magnitude of the stiffness of the elastic element 142 of the sensor 140 is still required, so as to prevent a fracture of the elastic element 142 itself due to an excessive strain generated when the first force F1 is applied on the elastic element 142.

Furthermore, as the driving element 110 is connected to the sensor 140 through the connecting element 130, if the stiffness of the elastic element 142 of the sensor 140 is too small, the elastic element 142 may be easily strained by various external forces, an extra strain is thus generated, and thereby the sensing accuracy of the sensor 140 is affected. In addition, when the stiffness of the elastic element 142 of the sensor 140 is too small, the driving element 110 is also moved owing to the large strain of the elastic element 142; thereby, an abnormal movement of the driving element 110 is generated, the stability of the driving element 110 is further affected, and an unexpected movement is generated by the moving element 120.

Referring to FIG. 1, the interaction force detection apparatus 100 further includes a base 170 disposed on one side of the sensor 140. The embodiment provides that the base 170 may be a first fixed element 172 in FIG. 1. The sensor 140 is connected to the connecting element 130 and the first fixed element 172, so a greater strain is generated when the first force F1 transmitted through the connecting element 130 is applied on the sensor 140. As such, the detection sensibility of the sensor 140 is enhanced. In addition, the interaction force detection apparatus 100 is fixed to the first fixed element 172 through the sensor 140.

As shown in FIG. 1, in the embodiment, the base 170 may also be a second fixed element 174 located on the other side of the driving element 110. Therefore, the interaction force detection apparatus 100 is fixed to the second fixed element 174 through the driving element 110.

In the embodiment, appropriate adjustment to the location of the base 170 may be made according to actual applications of the interaction force detection apparatus 100, such that the interaction force detection apparatus 100 is fixed through the base 170 itself or is fixed to a wall or various working platforms through the base 170.

Figure 2A:
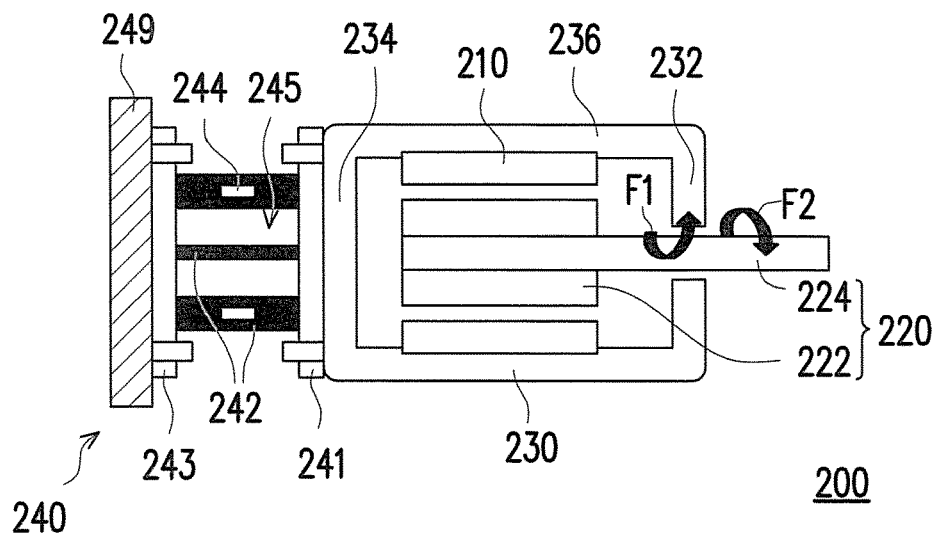
FIG. 2A is a schematic diagram illustrating an interaction force detection apparatus according to another exemplary embodiment.
Figure 2B:
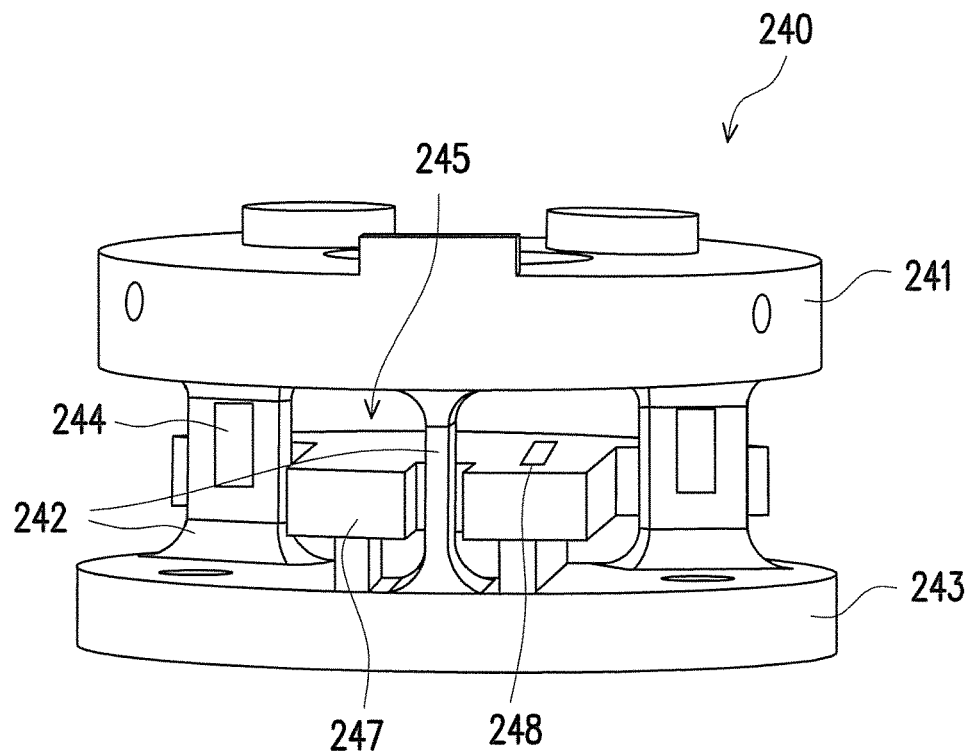
FIG. 2B is a schematic diagram illustrating partial components of the interaction force detection apparatus shown in FIG. 2A.

FIG. 2A is a schematic diagram illustrating an interaction force detection apparatus according to another exemplary embodiment. FIG. 2B is a schematic diagram illustrating partial components of the interaction force detection apparatus of FIG. 2A. The embodiment provides that the first force F1 exerted on the driving element 210 is detected by the interaction force detection apparatus 200 during the operation of the motor, and thereby a torque of the motor F2 is calculated.

As shown in FIG. 2A, the interaction force detection apparatus 200 may include a driving element 210, a moving element 220, a connecting element 230, and a sensor 240. The embodiment provides that the driving element 210 is a motor stator, the moving element 220 includes a motor rotor 222 and a motor shaft 224, and the motor rotor 222 is fixed to the motor shaft 224. In addition, the connecting element 230 is a motor casing 230. The motor casing 230 includes a first wall 232, a second wall 234 opposite to the first wall 232, and a side wall 236 connected between the first wall 232 and the second wall 234. The motor casing 230 is penetrated by the motor shaft 224 from the first wall 232.

In the embodiment, the sensor 240 of the interaction force detection apparatus 200 is disposed on the second wall 234 of the motor casing 230, and as shown in FIG. 2A, the sensor 240 is disposed on an outer side of the motor casing 230. Specifically, the sensor 240 is a torque sensor of the motor, and the sensor 240 is equipped with a first cover plate 241 and a second cover plate 243 disposed opposite to each other. At least one pillar 242 connected to the first cover plate 241 and the second cover plate 243. The first cover plate 241 is connected to the second wall 234 of the motor casing 230, and an accommodating space 245 is defined by the first cover plate 241, the second cover plate 243, and at least one pillar 242. The embodiment provides that the at least one pillar 242 is an elastic element and generates a strain in response to the first force F1. In addition, the strain gauge 244 is disposed on the at least one pillar 242 of the sensor 240, so as to measure the strain generated by the at least one pillar 242 when the first force F1 is exerted on the driving element 210.

Referring to FIG. 2B, the embodiment provides that the sensor 240 further includes a printed circuit board 247 and an IC chip 248 disposed on the printed circuit board 247. The printed circuit board 247 and the IC chip 248 are disposed in the accommodating space 245 defined by the first cover plate 241, the second cover plate 243, and the at least one pillar 242. In addition, the IC chip 248 is electrically connected to the strain gauge 244 through the printed circuit board 247, so as to receive an electrical signal from the strain gauge 244. The electrical signal is processed and analyzed by the IC chip 248. Furthermore, the printed circuit board 247 of the sensor 240 may further be electrically connected to an external apparatus or an external power source (not shown) disposed outside the interaction force detection apparatus 200, and thereby the electrical signal is transmitted to the external apparatus, or the printed circuit board 247 is electrically coupled to the external power source. If the printed circuit board 247 and the IC chip 248 are disposed in the accommodating space 245, a situation of the signal line being entangled with the motor shaft 224 and being pulled apart can be prevented.

As shown in FIG. 2A, the sensor 240 further includes a base 249 located on one side of the second cover plate 243 opposite to the at least one pillar 242. In the embodiment, the interaction force detection apparatus 200 is fixed through the base 249 of the sensor 240 or fixed to a flat surface through the base 249. For example, the interaction force detection apparatus 200 is fixed to a wall or other working platforms (not shown), so as to enhance the stability of the interaction force detection apparatus 200 during operation and to prevent the driving element 210 or the motor casing 230 of the interaction force detection apparatus 200 from generating an abnormal movement or an abnormal displacement which affects the sensing accuracy of the sensor 240.

Specifically, in the embodiment, a pair of forces is generated when a magnetic field of the motor stator 210 interacts with a magnetic field generated by the motor rotor 222. The pair of forces is non-contact-type (action-at-a-distance forces), and the pair of forces includes the first force F1 exerted on the motor stator 210 and the second force F2 exerted on the motor rotor 222. The motor shaft 224 is driven by the second force F2 to rotate about the direction of the right arrow as shown in FIG. 2A. In the embodiment, the correspondingly generated first force F1 is also exerted on the motor stator 210. In addition, the first force F1 exerted on the motor stator 210 is transmitted through the motor casing 230 to the sensor 240 connected to the motor casing 230. Since the first force $F_1$ and the second force F2 have equal magnitude but face opposite directions, when the first force F1 is detected by the sensor 240, the second force F2 exerted on the rotor is obtained. In other words, an output torque of the motor (i.e., the second force F2) is obtained through the detection of the sensor 240.

The first force F1 transmitted by the motor casing 230 is applied on the sensor 240, and the first force F1 allows the at least one pillar 242 of the sensor 240 to generate the corresponding strain. Next, the amount of a strain of the at least one pillar 242 is measured by the strain gauge 244, and the electrical signal derived from the strain measurement is transmitted to the IC chip 248. The electrical signal of the strain gauge 244 is received and processed by the IC chip 248, and the signal is thereby calculated and analyzed. The embodiment provides that a magnitude of the first force F1 exerted on the motor stator 210 and the motor casing 230 is calculated by the IC chip 248 according to the amount of the strain of the at least one pillar 242. Based on the magnitude of the first force F1, the second force F2 exerted on the motor rotor 222 and the motor shaft 224 is thereby calculated, and the output torque of the motor is further obtained.

In the embodiment, the magnitude of the first force F1 exerted on the motor stator 210 is detected by the sensor 240 through the motor casing 230, and the output torque of the motor is thereby calculated. Therefore, the sensor 240 is located outside the motor casing 230 without connecting the motor shaft 224. Furthermore, since a gear set is not required for connecting the sensor 240 and the motor shaft 224, the abrasion between the gear set and a bearing of the motor shaft 224 can be prevented, and an output torque of the motor can also be prevented from being further affected.

Similarly, since the sensor 240 is located outside the motor casing 230 without connecting the motor shaft 224, lubrication oil used to lubricate the motor shaft 224 does not pollute the sensor 240. In other words, the sensor 240 provided the embodiment is isolated from the motor casing 230 and thus not affected by environmental factors within the motor casing 230, for example, an operation temperature of the motor or pollutions from various lubrication oils. As such, the sensor 240 can be maintained and repaired easily, and reliability of the sensor 240 is further enhanced.

The sensor 240 provided in the embodiment is disposed in a way that a power line, a signal line, or other electrical signal transmission lines (not shown) of the sensor 240 does not have to pass through the motor shaft 224. Thus, during the rotation of the motor shaft 224, the power line or the signal line of the sensor 240 is thus prevented from being abraded or pulled apart due to the entanglement with the motor shaft 224. Therefore, in the embodiment, the effects on the transmission path of the electrical signal can be avoided, and thereby the stability of the signal transmission is enhanced.

In view of the foregoing, the interaction force detection apparatus in the embodiments of the disclosure is used to measure the first force exerted on the motor casing when the motor operates, and thereby the output torque of the motor is calculated. In the embodiments of the disclosure, the sensor used to detect the motor torque is located outside the motor casing. When the motor operates, the first force exerted on the motor stator can be exerted on the sensor through the motor casing. The magnitude of the first force and the output torque of the motor are calculated by the IC chip of the sensor according to the magnitude of the strain generated by the pillar which is strained by the first force measured by the strain gauge. Therefore, the output torque of the motor provided in the embodiments of the disclosure is calculated by the sensor of the interaction force detection apparatus directly through the first force transmitted by the motor casing. Because, in the embodiments of the disclosure, it does not need to have the sensor disposed on the motor shaft, the output torque of the motor is prevented from torque loss caused by the gear set.

Meanwhile, since the sensor is disposed outside the motor casing, the sensor is not affected by the environmental factors within the motor casing, for example, the operation temperature or pollutions from the lubrication oil. The sensing accuracy of the sensor is thus enhanced, and the sensor can be easily maintained. In addition, in view of the foregoing, the sensor provided in the embodiments of the disclosure is not required to be disposed on the motor shaft of the motor, entanglement of lines between the motor shaft and the sensor can be effectively prevented, and transmission reliability of the electrical signal of the sensor is thus enhanced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An interaction force detection apparatus, comprising:
   a sensor, comprising:
      a first cover plate;
      a second cover plate, disposed in opposite to the first cover plate;
      at least one elastic element, comprising at least one pillar connecting the first cover plate and the second cover plate to define an accommodating space;
      at least one strain gauge disposed on the at least one pillar; and
      an integrated circuit chip, being disposed in the accommodating space;
   a driving element;
   a moving element; and
   a connecting element connecting the driving element and the sensor, wherein the first cover plate is fixed to the driving element through the connecting element, wherein the sensor is separated from the moving element by the driving element, the driving element is adapted to interact with the moving element to generate a pair of forces comprising a first force and a second force, a magnitude of the first force is equal to that of the second force, the sensor detects the first force exerted on the driving element, and the second force is exerted on the moving element to generate a movement.

2. The interaction force detection apparatus of claim 1, wherein a stiffness of the at least one elastic element is less than a stiffness of the connecting element and is less than a stiffness of the driving element.

3. The interaction force detection apparatus of claim 1, further comprising a fixed base, wherein the sensor connects the fixed base and the connecting element, wherein the sensor is between the fixed base and the driving element.

4. The interaction force detection apparatus of claim 3, further comprising an integrated circuit chip disposed in the accommodating space of the sensor.

5. The interaction force detection apparatus of claim 1, wherein the moving element comprises a motor rotor and a motor shaft, the motor rotor is fixed to the motor shaft, the connecting element comprises a motor casing, the driving element comprises a motor stator fixed to the motor casing, and the sensor is a torque sensor.

6. The interaction force detection apparatus of claim 5, further comprising a fixed base, wherein the torque sensor connects the motor casing and the fixed base.

7. The interaction force detection apparatus of claim 1, wherein the at least one pillar is arranged at a periphery of the first cover plate and at a periphery of the second cover plate.

8. An interaction force detection apparatus, comprising:
   a sensor, comprising:
      a first cover plate;
      a second cover plate, disposed in opposite to the first cover plate;
      at least one strain gauge; and
      at least one elastic element, comprising at least one pillar connected the first cover plate and the second cover plate to define an accommodating space,
   wherein the at least one strain gauge is disposed on the at least one elastic element;
   a driving element;
   a moving element;
   a connecting element connecting the driving element and the sensor, wherein the first cover plate is fixed to the driving element through the connecting element; and
   an integrated circuit chip disposed in the accommodating space of the sensor, wherein the sensor is separated from the moving element by the driving element, the driving element is adapted to interact with the moving element to generate a pair of forces comprising a first force and a second force, a magnitude of the first force is equal to that of the second force, the sensor detects the first force exerted on the driving element and the at least one strain gauge transmits an electrical signal to the integrated circuit chip accordingly, and the second force is exerted on the moving element to generate a movement.

9. The interaction force detection apparatus of claim 8, a stiffness of the at least one elastic element is less than a stiffness of the connecting element and is less than a stiffness of the driving element.

10. The interaction force detection apparatus of claim 8, wherein the moving element comprises a motor rotor and a motor shaft, the connecting element comprises a motor casing, the driving element comprises a motor stator fixed to the motor casing, and the sensor is a torque sensor.

11. The interaction force detection apparatus of claim 8, wherein the at least one pillar is arranged at a periphery of the first cover plate and at a periphery of the second cover plate.

12. An interaction force detection apparatus, comprising:
   a sensor, comprising:
      a first cover plate;
      a second cover plate, disposed in opposite to the first cover plate;
      at least one elastic element, comprising at least one pillar connected between the first cover plate and the second cover plate; and
      at least one strain gauge disposed on the at least one pillar;
   a moving element, comprising a motor rotor and a motor shaft;
   a driving element, comprising a motor stator fixed to the motor casing;
   a connecting element connecting the driving element and the sensor, wherein the first cover plate is fixed to the driving element through the connecting element;
   an integrated circuit chip disposed in an accommodating space of the sensor; and
   a base, wherein the sensor connecting the base and the connecting element, the sensor is separated from the moving element by the driving element, the driving element is adapted to interact with the moving element to generate a pair of forces comprising a first force and a second force, a magnitude of the first force is equal to that of the second force, the sensor detects the first force exerted on the driving element and the at least one strain gauge transmits an electrical signal to the integrated circuit chip accordingly, the second force is exerted on the moving element to generate a movement, the first cover plate connects the motor casing, the second cover plate connects the base, and the at least one pillar connects the first cover plate and the second cover plate to define the accommodating space.

13. The interaction force detection apparatus of claim 12, wherein the motor casing comprises a first wall, a second wall opposite to the first wall, and a side wall connecting the first wall and the second wall, the motor shaft penetrates the first wall, the motor stator is fixed to the side wall, and the torque sensor connects the second wall.

14. The interaction force detection apparatus of claim 12, further comprising a printed circuit board, wherein the integrated circuit chip is disposed on the printed circuit board, the printed circuit board and the integrated circuit chip are disposed in the accommodating space, and the integrated circuit chip is electrically connected to the printed circuit board and is electrically connected to the at least one strain gauge.

15. The interaction force detection apparatus of claim 12, wherein the at least one pillar is arranged at a periphery of the first cover plate and at a periphery of the second cover plate.

16. An interaction force detection apparatus, comprising:
a sensor, comprising:
  a first cover plate;
  a second cover plate, disposed in opposite to the first cover plate;
  at least one elastic element, comprising at least one pillar connecting the first cover plate and the second cover plate to define an accommodating space;
  at least one strain gauge disposed on the at least one pillar; and
  an integrated circuit chip, being disposed in the accommodating space;
a driving element;
a moving element; and
a connecting element connecting the driving element and the sensor, wherein the sensor is fixed to the driving element through the connecting element, wherein the sensor is separated from the moving element by the driving element, the moving element is physically separated from the connecting element, the driving element is adapted to interact with the moving element to generate a pair of forces comprising a first force and a second force, a magnitude of the first force is equal to that of the second force, the sensor detects the first force exerted on the driving element, and the second force is exerted on the moving element to generate a movement,
wherein a stiffness of the at least one elastic element is less than a stiffness of the connecting element and is less than a stiffness of the driving element.

17. The interaction force detection apparatus of claim 16, further comprising a fixed base, wherein the sensor connects the fixed base and the connecting element, wherein the sensor is between the fixed base and the driving element.

18. The interaction force detection apparatus of claim 17, further comprising an integrated circuit chip disposed in the accommodating space of the sensor.

19. The interaction force detection apparatus of claim 16, wherein the moving element comprises a motor rotor and a motor shaft, the motor rotor is fixed to the motor shaft, the connecting element comprises a motor casing, the driving element comprises a motor stator fixed to the motor casing, and the sensor is a torque sensor.

20. The interaction force detection apparatus of claim 19, further comprising a fixed base, wherein the torque sensor connects the motor casing and the fixed base.

* * * * *